United States Patent [19]

Knutsson

[11] Patent Number: 4,582,977
[45] Date of Patent: Apr. 15, 1986

[54] PLANT FOR PROCESSING BY CUTTING MATERIAL WITH THE AID OF A LASER BEAM

[75] Inventor: Lars G. Knutsson, Järfälla, Sweden

[73] Assignee: Ingenjörsfirma G. Knutsson AB, Järfälla, Sweden

[21] Appl. No.: 598,316

[22] PCT Filed: Jul. 4, 1983

[86] PCT No.: PCT/SE83/00271
§ 371 Date: Mar. 2, 1984
§ 102(e) Date: Mar. 2, 1984

[87] PCT Pub. No.: WO84/00123
PCT Pub. Date: Jan. 19, 1984

[30] Foreign Application Priority Data
Jul. 5, 1982 [SE] Sweden .................. 8204154

[51] Int. Cl.⁴ .................. B23K 26/10; B23K 26/16
[52] U.S. Cl. .................. 219/121 LG; 219/121 LV; 219/121 L

[58] Field of Search .................. 219/121 LG, 121 LN, 219/121 FS, 121 LU, 121 LV, 121 LW, 121 L, 121 LM, 121 LQ, 121 LR

[56] References Cited
U.S. PATENT DOCUMENTS

| Re. 31,042 | 9/1982 | Clark et al. | 219/121 LG |
|---|---|---|---|
| 3,582,466 | 6/1971 | Quirk | 219/121 LG X |
| 3,866,398 | 2/1975 | Vernon, Jr. et al. | 219/121 FS X |
| 3,931,491 | 1/1976 | Stumpf | 219/121 LG |
| 4,149,062 | 4/1979 | Limmer et al. | 219/121 FS X |

Primary Examiner—M. H. Paschall
Attorney, Agent, or Firm—Burns, Doane, Swecker & Mathis

[57] ABSTRACT

A laser cutting plant includes a cutting head guidable in two directions, to which a laser beam is taken via three mutually perpendicular tubes (2, 4, 14) in sealed connection to each other and containing two deflection mirrors (22) for the beam. The laser beam unit is stationary. The mirrors are carried by the respective tube (4, 14) via flat throats (24) moving in longitudinal slits (21) in the connecting tubes (2, 4) said slits being covered by two opposing and resiliently engaging lips (31).

12 Claims, 7 Drawing Figures

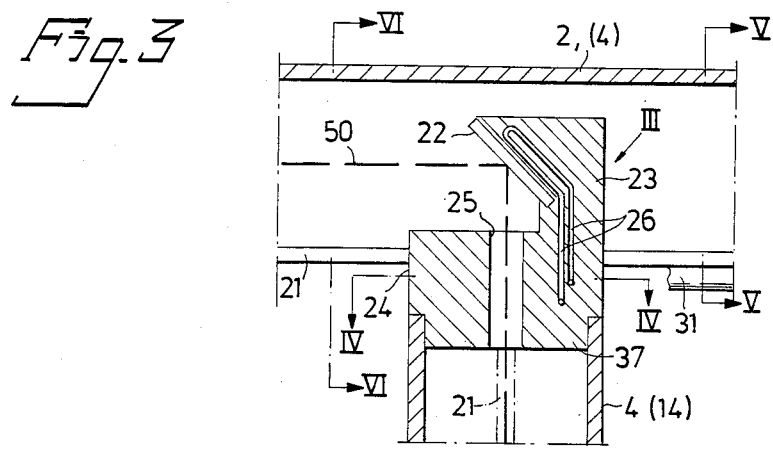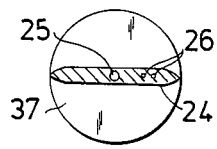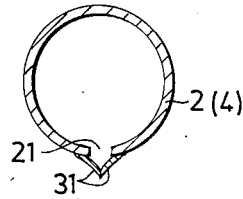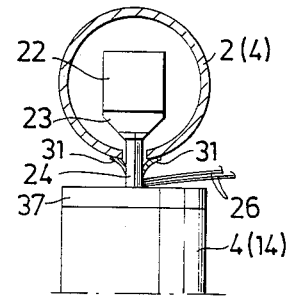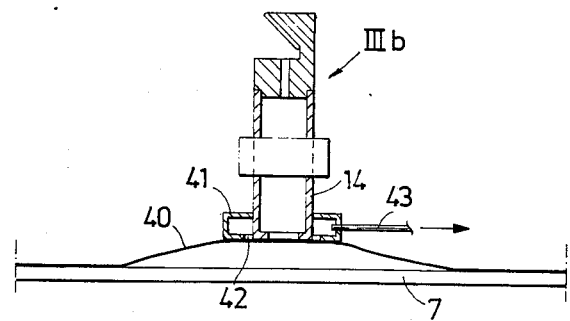

PLANT FOR PROCESSING BY CUTTING MATERIAL WITH THE AID OF A LASER BEAM

TECHNICAL FIELD

The invention relates to a plant for cutting material and more particularly, plants which cut material with the aid of a laser beam.

BACKGROUND OF THE INVENTION

Laser technology is well suited for cutting, e.g. cloth, plastic sheets, plate or fibre particle boards, since, inter alia, the cutting laser beam can be made very narrow and energy-intensive, whereby material waste will be very small.

For such cutting processing, it is suitable to arrange a work table for the material. A first slide can be displaceably arranged along the table and extend transverse the table. A second slide can be displaceably arranged on the first slide for displacement along the first slide, i.e. across the table. By controlled displacement of the two slides the second slide can be caused to find an arbitrary point on the table. Such controlled displacement can be provided by conventional technology with the aid of numerical control, i.e. the driving means of the slides are controlled with the aid of a programmed computer.

It is already known in plants of the kind mentioned in the introduction to mount the laser unit directly on the second slide, it thus being achieved that the beam can be easily enclosed along the short distance between the unit and the material to be cut. The exposed beam between the casing and material is so short that an operator can hardly come against, and be injured by the beam.

Since the laser unit can have a mass of about 400 kg, and since in plants of the kind in question it is desirable to have a cutting speed which is as high as possible in the plane of the table, it will be understood that the plant is subjected to large stresses due to the mass of the laser unit when the direction and rate of travel of the second slide are changed. For reasons of precision and strength, such a known plant must therefore be implemented very robustly and it will therefore be very expensive. The cutting speed can hardly be made larger than some few m/min even so.

The laser unit has therefore been placed stationary relative the table, the "weightless" laser beam being deflected instead to desired points on the table with the aid of deflection mirrors, the beam path then being enclosed in a telescopic-type tube system, cf SE 347 680. The tube system serves the purpose of preventing the operator from being injured by the laser beam, it thus preventing direct contact with the beam and constitutes a dazzle shield so that eye injuries are avoided. Furthermore, the system can serve to prevent dirtying the mirrors which are placed in the tube system.

Telescopic tube systems have been found to be substantially unusable, at least with relatively large cutting table surfaces, e.g. 2×3 m, and cutting speeds in the order of magnitude of 1 m/s.

Among the reasons for this is that it is very difficult to get a telescope sufficiently rigid when fully extended, since only the outer sections of the telescope can be supported. It is indeed possible to utilize telescopic tube sections for the telescope which have very great lengths relative their diameter and are also provided with long guides. However, this results in special difficulties with the second telescopic tube in the direction of the ray path, since it must carry a deflection mirror at the connection with the first telescopic tube. This mirror will then be outside the edge of the table by a telescopic section length. In order to be able to operate this mirror without vibration, which is particularly difficult since the sections of the first telescopic tube tend to hook into each other, the second slide would need to be provided with a support carrying the mirror in question at a distance from the table corresponding to a telescopic section length. In turn, this results in further weight problems.

Furthermore, the varying and periodical friction occurring in telescopic tubes would make the use of numerical control impossible, at least for a plant working at such a high speed, since every frictional resistance must be compensated for in the calculation of the control pulses to the driving means of the slide.

Another disadvantage with a telescopic tube system is that the air therein is pumped in and out, and dust would be deposited onto and fused into the mirrors.

SUMMARY AND OBJECT OF THE INVENTION

One object with the invention is to remove the mentioned drawbacks in known laser cutting plants which have a tube system through which the laser beam path extends.

The present invention provides a plant for cutting material with a laser beam comprising a slide, a first tube rigidly mounted above and to one side of a table along the direction of movement of the slide, a laser unit for directing a beam through the first tube and a second tube rigidly mounted to the slide and extending transverse to the direction of travel of the first slide. A first holder carried by the second tube extends through a first axial slit provided on the first tube and supports a first deflection mirror within the first tube. The first mirror deflects the beam from the first tube into the second tube. A second holder extends through a second axial slit provided on the second tube and supports a second mirror which deflects the beam from the second tube toward the table. The second holder is rigidly mounted to a second slide which is guided for movement along the first slide across the table. Each tube is suitably assigned a pair of elastic lips in mutual resilient engagement along the axial slit in the tube to cover the slit. The part of the mirror holder extending through the slit is suitably cuneiform in order to part the lips.

The second mirror holder which is rigidly mounted in relation to the second slide for deflecting the laser beam to the table, is suitably connected to a third tube, which contains a focusing lens for the beam at its end remote from the second holder.

The first tube is suitably closed off at its end remote from the laser unit. The second tube is suitably closed off at its end remote from the first mirror holder. The third tube suitably has an opening for the departing beam at its end which is remote from the second mirror holder. It is thus possible to introduce a pure gas into the first tube in the vicinity of the laser unit, and this pure gas can then flow through the first tube, the second tube and out through the third tube, thus preventing combustion gases or particles from the processed material coming into contact with the deflection mirrors or coming into the laser beam path. The mirror holder is suitably implemented such that gas can freely pass the holder in the tube, thus substantially avoiding local pressure variations in the tube as a result of displacing the holder.

If so desired, the pure gas can of course be flushed through each tube separately.

The laser unit may include a $CO_2$ laser, for example, which sends coherent light having a wavelength somewhat greater than 10.6 μm. Laser power, e.g. in cutting cloth, may attain some hundreds of watts, the beam having a diameter of say 6–15 mm. Plexiglas ® may be used as the tube material for this wavelength, but is should be quite clear that almost any kind of material may be used for the tubes, since they are primarily intended to serve as touch protection.

The mirror holders may include a pipe coil through which a cooling fluid, e.g. a cooling liquid, can be passed for cooling the mirror. Alternatively, the pure gas can be utilized as coolant for the mirrors.

A preferred embodiment of the invention will now be described in detail in the following with reference to the accompanying drawing.

BRIEF DESCRIPTION OF THE DRAWINGS

The preferred embodiment of the invention will now be described in detail with reference to the accompanying drawing, wherein

FIG. 3 is a section along the mirror holder connections between two tubes denoted in FIG. 1 by IIIa and IIIb;

FIG. 4 is a section taken along the IV—IV in FIG. 3;

FIG. 5 is a section taken along the line V—V in FIG. 3;

FIG. 6 is a section taken along the line VI—VI in FIG. 3; and

FIG. 7 is a detailed view of an evacuation nozzle surrounding the opening of the tub facing the material which is to be cut.

DETAILED DESCRIPTION OF THE PREFERRED EMBODIMENT

Figure 1:
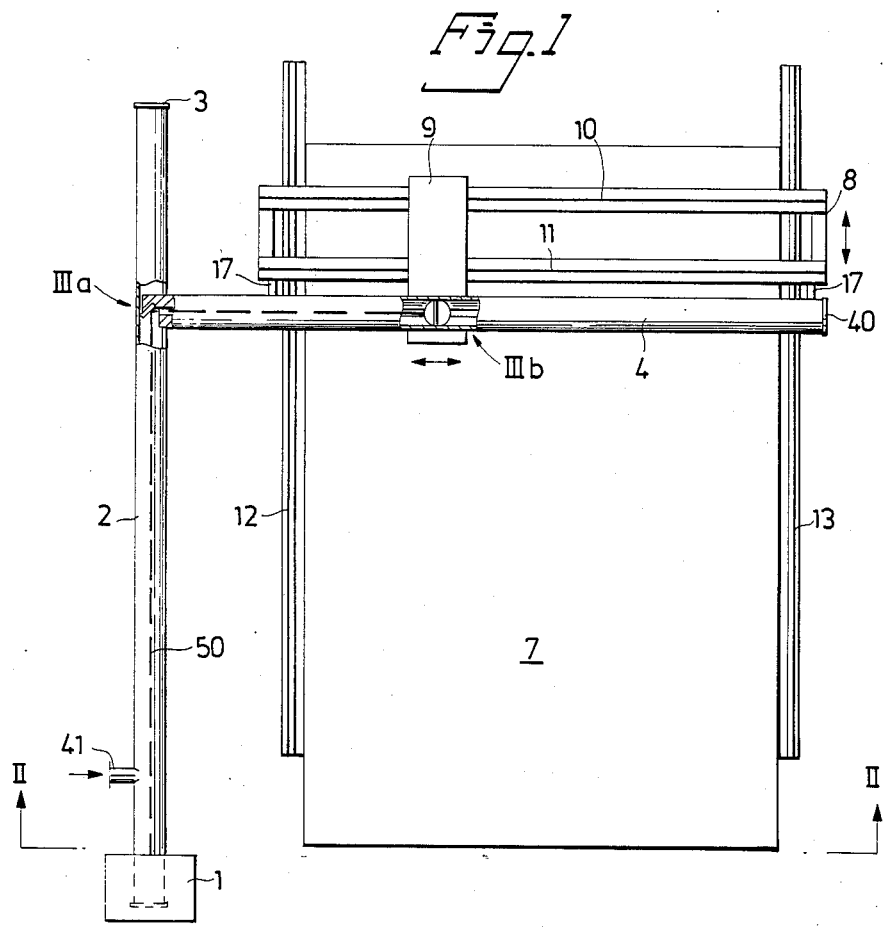
FIG. 1 is a schematic planar view of a plant in accordance with the invention, taken along the line I—I in FIG. 2.
Figure 2:
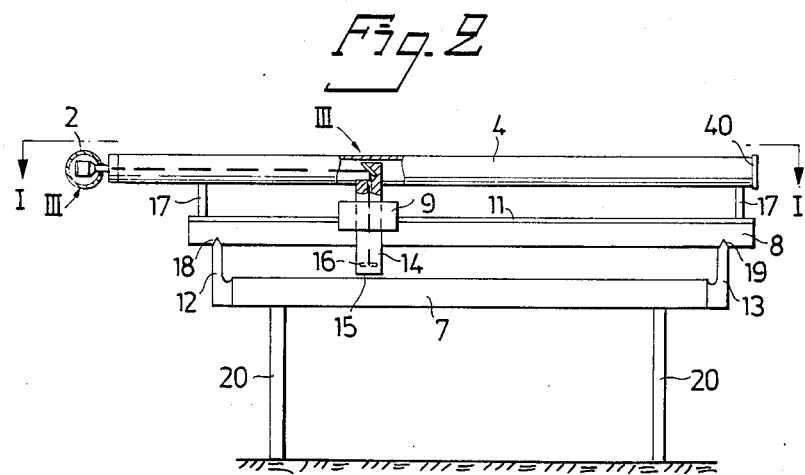
FIG. 2 is a end view of the plant according to FIG. 1, taken along the line II—II in FIG. 1.

In FIGS. 1 and 2 there is shown a work table 7 provided at its sides with guide rails 12 and 13 for a first slide 8, which has grooves 18 and 19 on its underside for the rails 12 and 13, respectively. The first slide 8 extends over the entire width of the table 7, and has on its upper side a pair of guide rails 10 and 11 for a second slide 9, which is guided by a pair of unillustrated guide grooves for travel along the rails 10 and 11. The table 7 is carried by a frame denoted by the numeral 20.

A laser unit 1 is disposed stationary in relation to the table 7. The laser unit 1 is adapted to send a beam 50 extending parallel to the surface of the table 7, at one side of the table and at the side of, or above the second slide 9. The beam 50 extends coaxially through a first tube 2, which is disposed stationary in relation to the table 7. The tube 2 has an axial slit on the right-hand side of the tube 2 in the plane of the Figure in FIG. 1. In tube 2 there is a mirror holder with mirror, generally denoted by IIIa. The mirror deflects the beam 50 so that it extends out through the slit in the tube 2 and coaxially into a connecting tube 4, which is mounted on the first slide 8 with the aid of holders 17. The tube 4 also has an axial slit, disposed on its underside in FIG. 1.

A further mirror holder and mirror generally denoted by IIIb is disposed in the second tube 4 such that the beam 50 can be deflected downwards through the axial slit of the tube and coaxially into a third tube 14 containing a focusing lens 16 for the beam, and which at its lower portion has an opening 15 for the focused laser beam. The opening 15 is arranged close to the material laid up on table 7 for cutting. At its remote end the tube 2 is closed by a cover 3, and in a corresponding way the tube 4 is closed by a cover 40 at its remote end. Referring to FIG. 5, the slit 21 of tubes 2, 4 is covered by a pair of elastic lips 31, which are attached to the tube and are in mutual resilient engagement opposite the slit 21.

The mirror holder denoted by IIIa and IIIb in FIGS. 1 and 2 is more closely illustrated in FIGS. 3, 4 and 6. The mirror holder III includes a head 23 on which a mirror 22 is adjustably mounted, the mirror being generally kept at an angle of about 45° to the incident beam 50, such that the mirror deflects the beam 50 out through the tube slit 21. The mirror holder head 23 is carried by a shank portion 24, the width of which is suited to the width of the slit 21 for travel along the slit. The edges of the shank portion 24 are given a plough shape for easily parting the lips 31. In its turn, the shank portion 24 is carried by a foot part 37 tightly sealing against the connecting tube 4, (14). An opening 25 is arranged in the shank portion and foot part of the mirror holder to allow free passage for the deflected beam 50 and possibly a gas introduced into the tubes. A ducting coil 26 is arranged in the mirror holder, e.g. for carrying cooling liquid for cooling the mirror 22.

When, for example, the tube 4 of the first slide 8 is moved relative the tube 2, the shank portion 24 of the mirror holder will move along the slit 21 of the tube 2 and by reason of its plough shape move the lips 31 apart, the lips either sealing against each other or against the long sides of the shank portion 24, due to their elasticity. The laser beam will therefore extend entirely enclosed from the unit 1 to the opening 15 of the third tube 14 irrespective of the movements of the slides 8, 9 and thereby the movements of the tubes 4, 14 relative the unit, and the enclosure is so complete that an operator cannot unintentionally come into contact with the laser beam 50. The enclosure provided by the tubes, lips and mirror holders is further such that a protective gas can be introduced, e.g. at the gas inlet 41 adjacent to laser unit 1, with a small excess pressure and without too much leakage such that it flows to the tube 2, through the mirror holder denoted by III at the junction between tubes 2 and 4, through the tube 4, through the mirror holder III at the junction between tubes 4 and 14, through the tube 14 and out through the opening 15.

To advantage, the table 7 can be made from expanded metal, honeycomb material or the like, and a vaccum source may be connected to the underside of the table. If the table is made from expanded metal or the like, the risk of damage to the table from the laser beam is reduced, and material debris can fall down through the interstices in the table surface. If a vaccum source is connected to such a table, both particles of material and combustion gases may be easily removed.

With a plant in accordance with the invention, dimensioned in correspondence with the plant in which the laser unit is movably mounted, cutting speeds in the order of magnitude of 1 m/s can be easily achieved.

As will be seen from FIG. 7, the opening of the tube 14 is surrounded by a suction box 41 having an annular slit 42. The box 41 is evacuated via a conduit 43, the evacuation of smoke etc. being enabled via the slit 42 and conduit 43.

It is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A plant for cutting material with the aid of a laser beam, comprising a work table on which the material is intended to be placed, a first slide guided for movement along the table, a second slide guided for movement along the first slide across the table, a laser unit stationary relative to the table, a first tube rigidly mounted substantially parallel to the table and extending above the surface of the table to one side thereof substantially in the traveling direction of the first slide, the beam of the laser unit being directed through said first tube, a second tube which is rigidly mounted on the first slide and extends transverse the traveling direction of said first slide, a first deflection mirror disposed in the first tube to deflect the laser beam so that it is directed through the second tube, a second mirror disposed in the second tube for deflecting the beam toward the work table, the first and second tubes being arranged in mutual communication during travel of the first and second slides, the first tube having an axial slit, the first mirror supported by a first holder carried by the second tube, said first holder extending through the axial slit of the first tube, the first holder having a bore through which the beam deflected by the first mirror propagates, the second tube having a second axial slit, the second mirror supported by a second holder rigidly mounted on the second slide, said second holder extending through the axial slit of the second tube, the second holder having a bore through which the beam deflected by the second deflection mirror propagates toward the surface of the table.

2. The plant as claimed in claim 1, wherein each tube includes a pair of elastic lips along the axial slit, each pair of elastic lips resiliently engaging against each other and against one of the holders for screening off the axial slit.

3. The plant as claimed in claim 1, wherein a third tube is connected to the second holder, the third tube containing at its end facing away from the holder means for focusing the laser beam.

4. The plant as claimed in claim 3, wherein the third tube has at its free end an evacutaion nozzle for evacuating generated smoke.

5. The plant as claimed in claim 4, wherein the nozzle is annular and surrounds the opening of the third tube.

6. An apparatus for cutting material with a laser beam, comprising:

a table surface;
a first tubular member fixed relative to said table surface and having a first axial slit;
a second tubular member positionable over said table and having a second axial slit;
laser means for directing a laser beam in a first direction axially through said first tubular member;
means for moving said second tubular member in said first direction at a fixed angle relative to said first tubular member;
a first holder extended from said second tubular member through said first axial slit;
first mirror means supported by said first holder so as to be axially movable within said first tubular member for reflecting said laser beam from said first direction toward a second direction axially through said second tubular member;
a second holder extended through said second axial slit;
means for moving said second holder in said second direction along said second slit; and
second mirror means within said second tubular member and supported by said second holder so as to be axially movable within said second tubular member for reflecting said laser beam from said second direction toward a third direction intersecting a plane of said table surface; and
elastic means along each axial slit for screening off the axial slit.

7. The apparatus as claimed in claim 6, wherein said elastic screening means includes opposing elastic lips along the axial slit, said elastic lips of each axial slit resiliently engaging each other and against one of the holders, each holder including a bore for allowing passage of said laser beam through said holder.

8. The apparatus as claimed in claim 7, wherein said means for moving said second tubular member includes a first slide movable in said first direction along a rail fixed relative to said table, said means for moving said second tubular member includes a second slide and a second rail, said second rail being parallel to said second tubular member and affixed to said first slide, said second slide being movable along said second rail, said second slide supporting said second holder.

9. The apparatus as claimed in claim 8, wherein a third tubular member extending in said third direction is connected to said second holder, said third tubular member containing at an end away from said second holder means for focusing the laser beam.

10. The apparatus as claimed in claim 9, wherein the third tubular member has at its free end an evacuation nozzle for evacuating generated smoke.

11. The apparatus as claimed in claim 10, wherein the nozzle is annular and surround the opening of the third tube.

12. The apparatus as claimed in claim 7, wherein each tubular member is closed off at its end remote from said laser means.

* * * * *